United States Patent
Ooba

(10) Patent No.: US 10,604,357 B2
(45) Date of Patent: Mar. 31, 2020

(54) ARTICLE TRANSFER SYSTEM AND ROBOT SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/213,000

(22) Filed: Dec. 7, 2018

(65) Prior Publication Data

US 2019/0225433 A1    Jul. 25, 2019

(30) Foreign Application Priority Data

Jan. 25, 2018    (JP) ................................. 2018-010500

(51) Int. Cl.
     *B65G 47/76*      (2006.01)
     *G05B 19/418*      (2006.01)
     (Continued)

(52) U.S. Cl.
     CPC .......... *B65G 47/766* (2013.01); *B25J 9/0093* (2013.01); *B25J 9/1697* (2013.01); *B65G 43/00* (2013.01);
     (Continued)

(58) Field of Classification Search
     CPC ...... B65G 43/00; B65G 43/08; B65G 47/256; B65G 47/766; B65G 47/82; B65G 47/905;
     (Continued)

(56) References Cited

U.S. PATENT DOCUMENTS 4,476,981 A * 10/1984 Yoshida ................. B65G 47/82
                                                                     198/370.07
5,165,520 A * 11/1992 Herve ....................... B07C 5/02
                                                                       198/396
(Continued)

FOREIGN PATENT DOCUMENTS

EP          1522911 A2      4/2005
JP       H08-063214 A     3/1996
(Continued)

OTHER PUBLICATIONS

Office Action dated Dec. 24, 2019, in corresponding Japanese Application No. 2018-010500; 11 pages.

*Primary Examiner* — Gene O Crawford
*Assistant Examiner* — Keith R Campbell
(74) *Attorney, Agent, or Firm* — Maier & Maier, PLLC

(57) ABSTRACT

An article transfer system including: a transfer device that transfers an article in one direction; a travel distance detecting unit that sequentially detects a distance the article transferred by the transfer device has traveled; an article sensing unit that senses passage of the article transferred by the transfer device; an image capturing unit that photographs the article, the image capturing unit being disposed downstream of the article sensing unit in a transfer direction of the transfer device; a position-and-orientation detecting unit that processes an image captured with the image capturing unit to extract the article and detect a position and an orientation of the article; and a removal unit that removes the article, which has been sensed with the article sensing unit but not extracted by the process performed in the position-and-orientation detecting unit, from the transfer device, the removal unit being disposed downstream of the image capturing unit.

5 Claims, 7 Drawing Sheets

(51) Int. Cl.
| | |
|---|---|
| *B65G 43/08* | (2006.01) |
| *B25J 9/00* | (2006.01) |
| *B25J 9/16* | (2006.01) |
| *B65G 43/00* | (2006.01) |
| *B65G 47/82* | (2006.01) |
| *B65G 47/256* | (2006.01) |

(52) U.S. Cl.
CPC ............ *B65G 43/08* (2013.01); *B65G 47/82* (2013.01); *G05B 19/4182* (2013.01); *B65G 47/256* (2013.01); *B65G 2203/0225* (2013.01); *B65G 2203/0233* (2013.01); *B65G 2203/041* (2013.01); *B65G 2203/044* (2013.01)

(58) Field of Classification Search
CPC .... B65G 2203/0225; B65G 2203/0233; B65G 2203/041; B65G 2203/044; B25J 9/0093; B25J 9/1697; G05B 19/4182
See application file for complete search history.

(56) References Cited

U.S. PATENT DOCUMENTS

| | | | |
|---|---|---|---|
| 5,727,132 | A | 3/1998 | Arimatsu et al. |
| 9,643,796 | B2* | 5/2017 | Koga .................... B25J 9/1697 |
| 10,353,383 | B2* | 7/2019 | Maruno ................. G06T 17/00 |
| 10,442,633 | B2* | 10/2019 | Ooba ....................... B07C 1/04 |
| 2005/0075752 | A1 | 4/2005 | Ban et al. |
| 2007/0179671 | A1* | 8/2007 | Arimatsu ........... G05B 19/4182 700/247 |
| 2016/0368039 | A1* | 12/2016 | Zhang ................... B21D 43/20 |
| 2019/0101885 | A1* | 4/2019 | Oya .......................... G06T 7/73 |

FOREIGN PATENT DOCUMENTS

| | | |
|---|---|---|
| JP | 2000-071188 A | 3/2000 |
| JP | 2001-019154 A | 1/2001 |
| JP | 2003-104322 A | 4/2003 |
| JP | 2005-111607 A | 4/2005 |
| JP | 2009183818 A | 8/2009 |
| JP | 2013-177217 A | 9/2013 |
| JP | 2017-088184 A | 5/2017 |
| JP | 2017-221980 A | 12/2017 |

* cited by examiner

ARTICLE TRANSFER SYSTEM AND ROBOT SYSTEM

CROSS-REFERENCE TO RELATED APPLICATIONS

This application is based on Japanese Patent Application No. 2018-010500, the content of which is incorporated herein by reference.

FIELD

The present invention relates to an article transfer system and a robot system.

BACKGROUND

There is known a robot system with which an article being transferred by a transfer device is photographed with a camera to determine the position and orientation of the article, and a robot is track-controlled on the basis of the determined position and orientation and the article travel distance detected with an encoder so that the robot performs a task on the article while the article is being transferred (for example, refer to Japanese Unexamined Patent Application, Publication No. 2005-111607).

With this robot system, when detection of the position of the article fails, the robot system enters a next image capture preparation mode.

SUMMARY

An aspect of the present invention is directed to an article transfer system including a transfer device that transfers an article in one direction; a travel distance detecting unit that sequentially detects a distance the article transferred by the transfer device has traveled; an article sensing unit that senses passage of the article transferred by the transfer device; an image capturing unit that photographs the article, the image capturing unit being disposed downstream of the article sensing unit in a transfer direction of the transfer device; a position-and-orientation detecting unit that processes an image captured with the image capturing unit to extract the article and detect a position and an orientation of the article; and a removal unit that removes the article, which has been sensed with the article sensing unit but not extracted by the process performed in the position-and-orientation detecting unit, from the transfer device, the removal unit being disposed downstream of the image capturing unit.

Another aspect of the present invention is directed to a robot system including the article transfer system according to any one of the systems described above; a robot that performs a task on the article, which is being transferred by the transfer device, in an operation region disposed downstream of the removal unit of the article transfer system; and a controller unit that controls the robot, in which the controller unit commands the robot to track the article on the basis of a travel distance of the article detected with the travel distance detecting unit and a position and an orientation of the article detected with the position-and-orientation detecting unit.

DETAILED DESCRIPTION

An article transfer system 2 and a robot system 1 according to one embodiment of the present invention will now be described with reference to the drawings.

Figure 1:
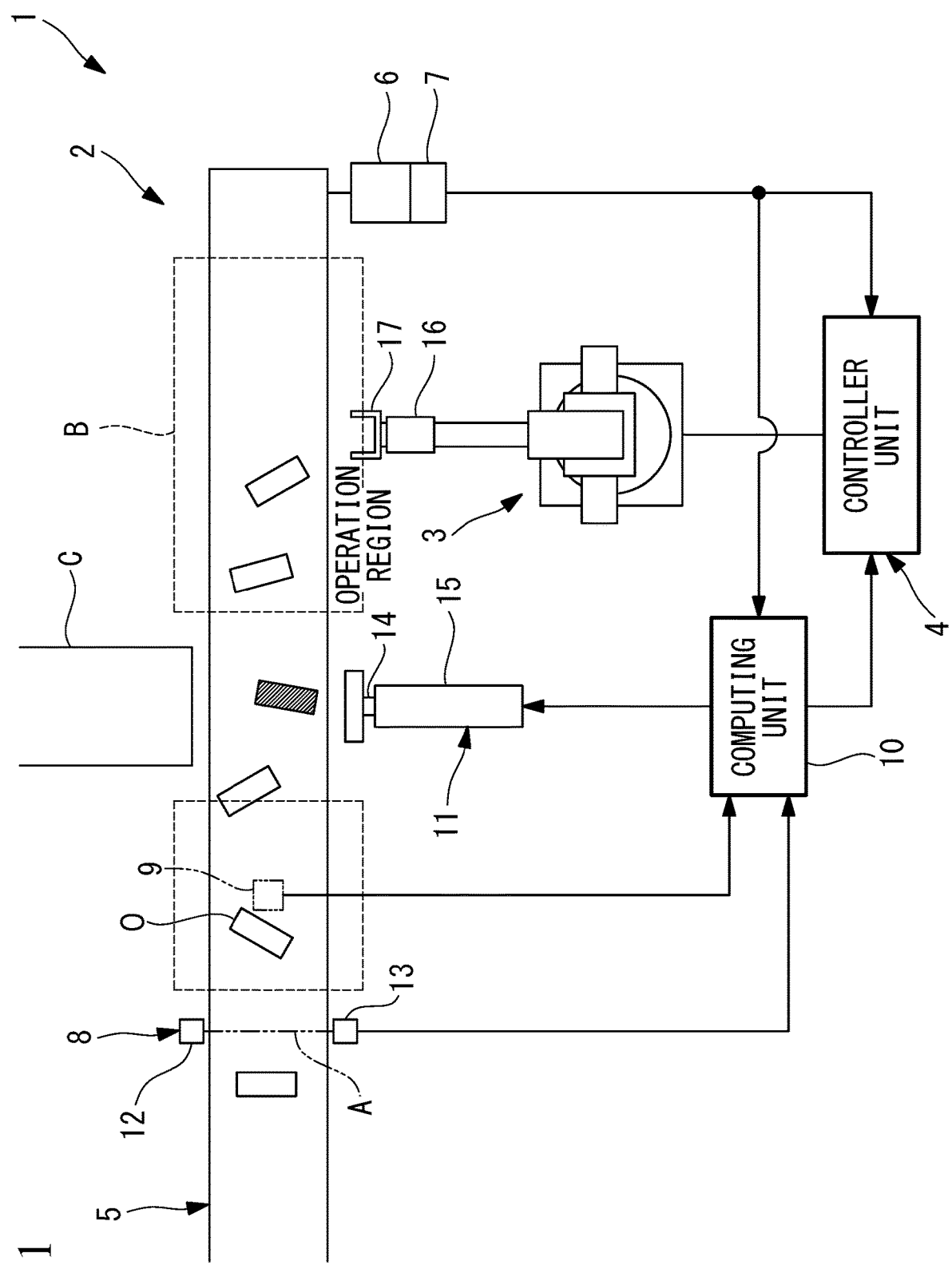
FIG. 1 is a diagram illustrating the overall structures of an article transfer system and a robot system according to one embodiment of the present invention.

As illustrated in FIG. 1, the robot system 1 of this embodiment is equipped with an article transfer system 2, a robot 3, and a controller unit 4.

The article transfer system 2 of this embodiment includes a conveyor (transfer device) 5 that transfers an article O mounted thereon in one direction (transfer direction); an encoder (travel distance detecting unit) 7 installed in a motor 6 that drives the conveyor 5 to detect the rotation angle of the motor 6; a sensor (article sensing unit) 8 that detects passage of the article O on the conveyor 5; a camera (image capturing unit) 9 disposed downstream of the sensor 8 in the transfer direction; a computing unit (position-and-orientation detecting unit) 10 that processes the image captured with the camera 9 and detects the position and orientation of the article O; and a removal unit 11 that removes the article O on the conveyor 5, the removal unit 11 being disposed downstream of the camera 9. The encoder (travel distance detecting unit) 7 may have a roller at its tip, and the roller may be pressed against the conveyor (transfer device) 5.

The sensor 8 is, for example, an optical sensor arranged so that the optical axis A extending in the width direction of the conveyor 5 passes above the conveyor 5 with a gap larger than the height of the article O between the optical axis A and the conveyor 5. The sensor 8 includes a light-emitting unit 12 that emits light, and a light-receiving unit 13 that receives light and faces the light-emitting unit 12 with the conveyor 5 therebetween in the width direction. A front end of the article O is detected as the article O transferred by the conveyor 5 blocks the light emitted from the light-emitting unit 12, and a rear end of the article O is detected as the light blocked by the article O is no longer blocked and enters the light-receiving unit 13.

The camera 9 is disposed vertically above the conveyor 5 with a gap between the camera 9 and the conveyor 5, and has an optical axis directed vertically downward so that the article O, which has been transferred by the conveyor 5, can be photographed from vertically above.

The computing unit 10 processes the image captured with the camera 9, and extracts the article O in the image through pattern matching or the like, for example. In this manner, in the image, the position of the article O in the horizontal direction and the rotation angle (orientation) of the article O about the vertical axis can be detected.

The computing unit 10 outputs a remove command signal to the removal unit 11 if the image processing results fail to extract the article O in the image. The remove command signal from the computing unit 10 is output to the removal unit 11 when the distance the undetected article O has traveled after being sensed with the sensor 8 becomes equal to the distance between the sensor 8 and the removal unit 11.

Figure 2:
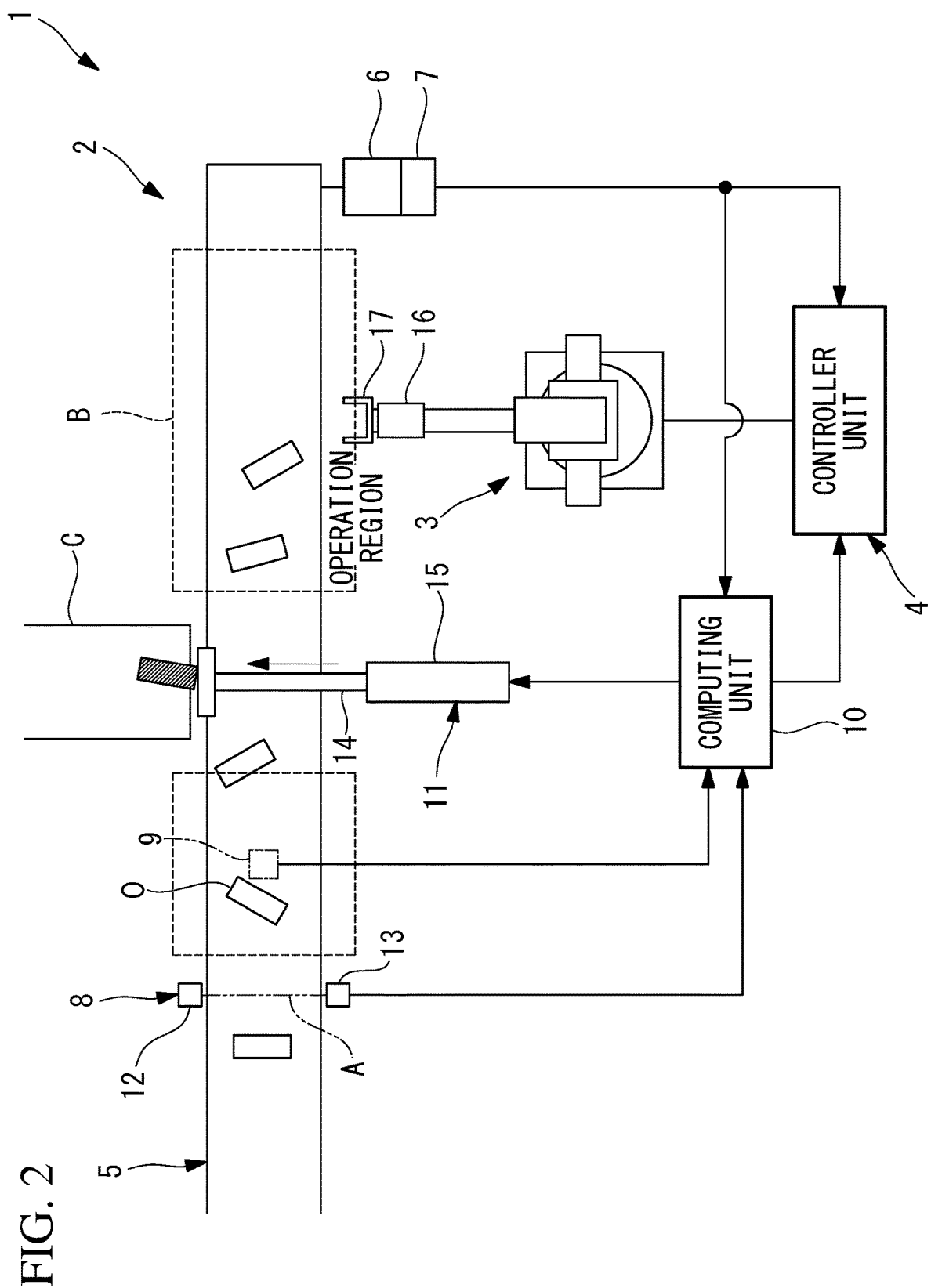
FIG. 2 is a diagram that illustrates the task performed with a removal unit of the robot system illustrated in FIG. 1.

As illustrated in FIGS. 1 and 2, the removal unit 11 is equipped with, for example, a bar-shaped removal piece 14 that extends along the transfer direction, and a cylinder 15 that linearly moves the removal piece 14 in the width direction of the conveyor 5. Upon receiving the remove command signal from the computing unit 10, the removal unit 11 moves the cylinder 15 so as to move the removal piece 14 from one side to the other side of the conveyor 5 in the width direction. As a result, as illustrated in FIG. 2, the article O on the conveyor 5 can be pushed out (removed) outward in the width direction of the conveyor 5. In the drawings, the article O hatched with lines is the undetected article.

The robot 3 is, for example, a six-axis multijoint robot disposed near the conveyor 5, and is equipped with a wrist 16 and a hand 17 at the tip of the wrist 16 so that the article O transferred by the conveyor 5 can be grasped with the hand 17 and handled. The robot 3 can handle an article O that exists in an operation region B located downstream of the removal unit 11 in the transfer direction.

The controller unit 4 receives a detection signal from the sensor 8 and information regarding the travel distance from the encoder 7. The controller unit 4 identifies the position of the article O the moment the front end of the article O is sensed with the sensor 8, and identifies the current position of the article O from the distance the article O has traveled since that moment, said distance being input from the encoder 7.

Through tracking control, the controller unit 4 moves the robot 3 according to a preliminarily taught operation program and the identified current position of the article O so that the robot 3 tracks the article O, which is being transferred by the conveyor 5, and performs a task on the article O.

The tracking control is described here.

Figure 3:
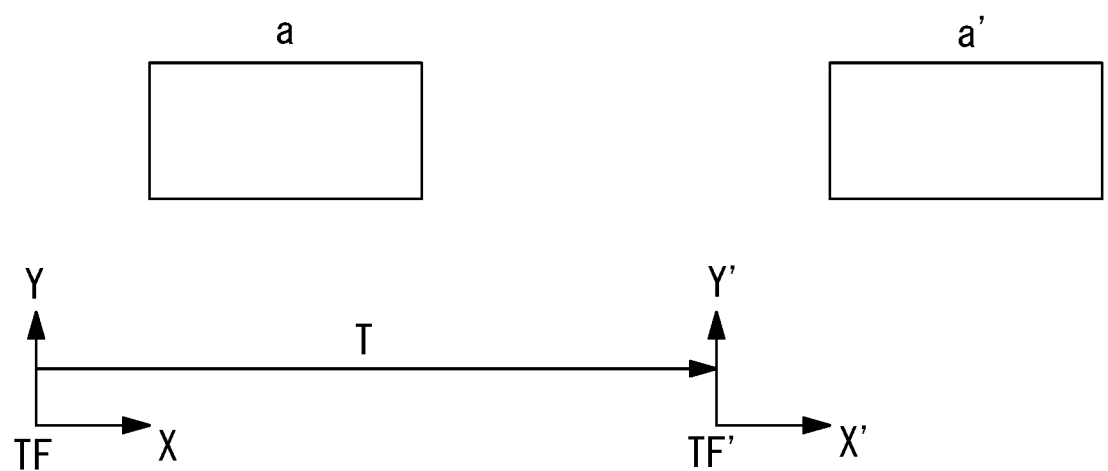
FIG. 3 is a diagram that illustrates the coordinate system used in track-controlling a robot in the robot system illustrated in FIG. 1.

As illustrated in FIG. 3, if a tracking coordinate system relative to an article O at the time the article O is sensed with the sensor 8 is defined as TF and a current tracking coordinate system is defined as TF', then the tracking coordinate systems TF and TF' satisfy the following relationship.

$$TF' = T \cdot TF$$

where T represents a coordinate transformation matrix.

The component of the coordinate transformation matrix T is (e2-e1)/Scale, where e1 represents the encoder count at the time of the article is sensed with the sensor 8, e2 represents the current encoder count, and Scale represents a transformation coefficient for the encoder count and the travel distance.

In FIG. 3, reference sign a indicates the position of the article O as viewed from the tracking coordinate system TF at the time of sensing with the sensor 8, and reference sign a' indicates the position of the article O as viewed from the current tracking coordinate system TF'.

The controller unit 4 commands the robot 3 to track the article O and perform a task on the basis of the tracking coordinate system TF'.

The effects of the article transfer system 2 and the robot system 1 of this embodiment having the above-described features are described below.

According to the article transfer system 2 of this embodiment, as an article O is transferred by the conveyor 5, first, the light from the sensor 8 is blocked, and thus passage of the article O is sensed. Subsequently, the article O is photographed with the camera 9, and an image is captured.

The captured image is processed in the computing unit 10 so as to extract the article O and detect the position and orientation of the article O extracted.

Meanwhile, the travel distance of the article O is sequentially detected with the encoder 7. Thus, it is not necessary to sequentially capture images with the camera 9 from above the conveyor 5 and sequentially process the captured images in the computing unit 10. That is, the position and orientation of the article O can be detected by capturing an image with the camera 9 only when it is determined that the article O, after having been sensed with the sensor 8, has entered the field of view of the camera 9 on the basis of the distance the sensed article O has travelled sequentially detected with the encoder 7. Thus, the process can be simplified.

In this case, for some reason such as ambient light, etc., the article O sensed with the sensor 8 cannot always be extracted from the image captured with the camera 9. In such a case, the computing unit 10 moves the removal unit 11 on the basis of the signal from the sensor 8 indicating sensing of the article O and the article O travel distance from the encoder 7. As a result, the article O, for which extraction in the computing unit 10 has failed, is removed from the conveyor 5 to a removal region C, such as another conveyor or the like.

In other words, an article O, presence on the conveyor 5 of which is confirmed by sensing with the sensor 8 but position and orientation of which are undetected due to extraction failure in the computing unit 10 is prevented from entering the operation region B of the robot 3. In this manner, when the robot 3 performs a task on another article O, interference with the undetected article O can be unfailingly prevented.

Moreover, since an optical sensor having an optical axis A extending in the width direction of the conveyor 5 is employed as the sensor 8, the position of the article O in the transfer direction can be easily and accurately detected.

Moreover, since the removal unit 11 is configured to push out the article O in the width direction of the conveyor 5, the article O can be unfailingly removed even when the article O is not extracted from the image captured with the camera 9 and the position and orientation of the article O are not identified.

Note that although the computing unit 10 and the controller unit 4 are separately provided in this embodiment, the computing unit 10 may be installed in the controller unit 4.

Figure 4:
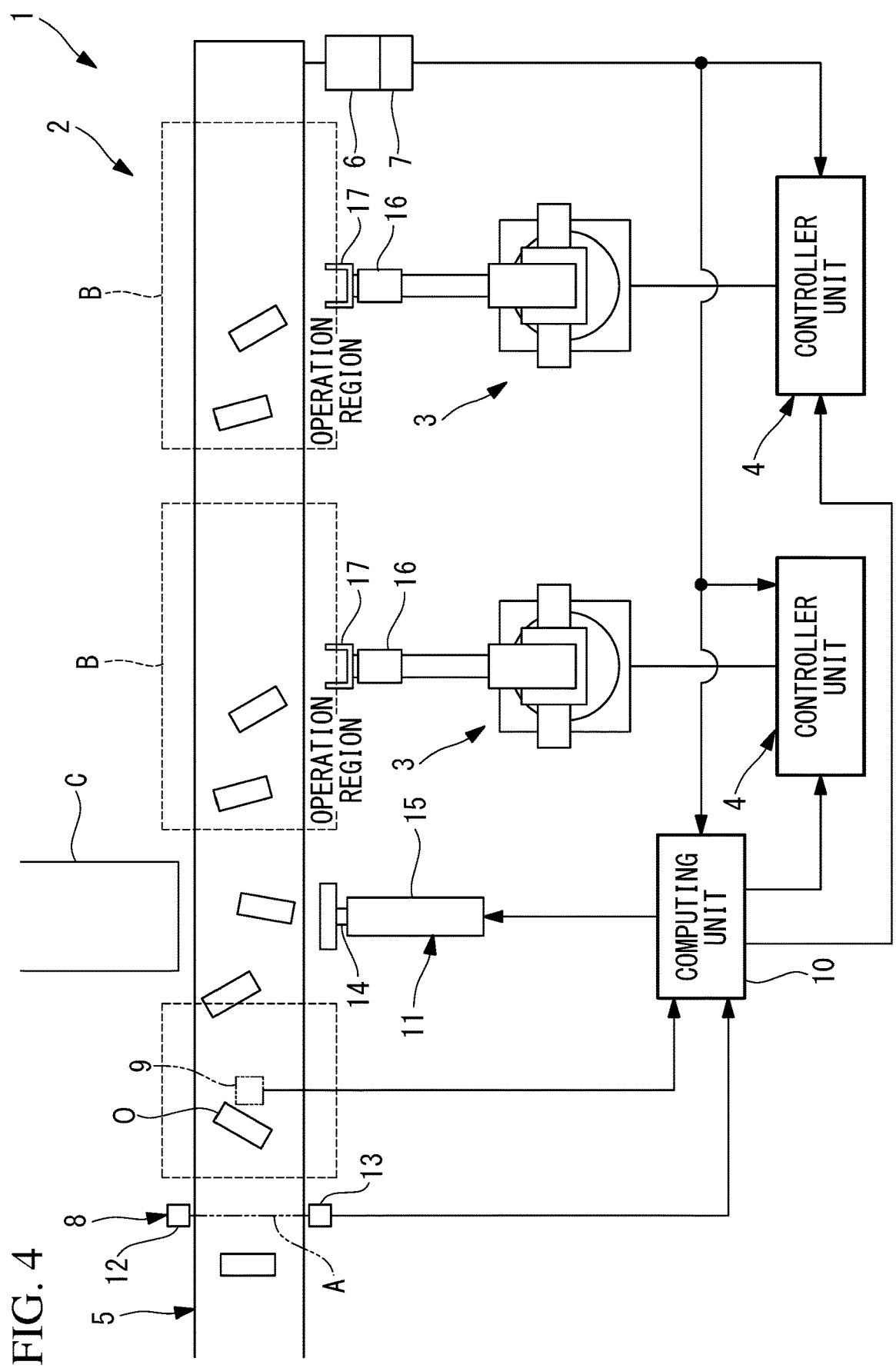
FIG. 4 is an enlarged view of a first modification of the robot system illustrated in FIG. 1.

Moreover, as illustrated in FIG. 4, a plurality of robots 3 may be placed near the conveyor 5 to share the task. As a result, the operation can be streamlined.

Figure 5:
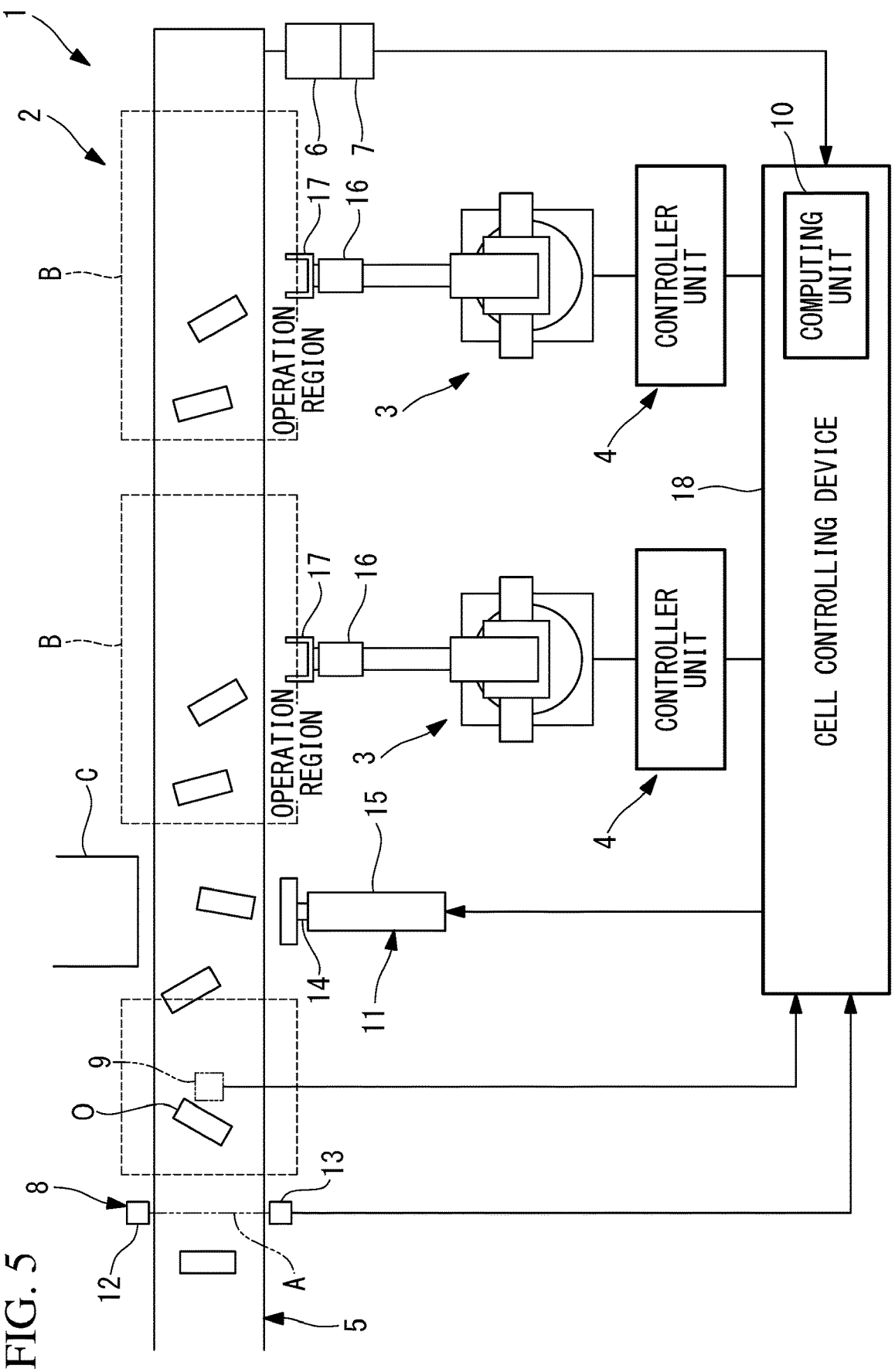
FIG. 5 is an enlarged view of a second modification of the robot system illustrated in FIG. 1.

When a plurality of robots 3 are placed near the conveyor 5, as illustrated in FIG. 5, the controller units 4 of the robots 3 may be connected to a cell controlling device 18. A computing unit 10 that calculates the current position of the article O on the basis of the information from the sensor 8 and the encoder 7 may be installed in the cell controlling device 18, and the calculated current position may be used in the controller units 4 to respectively control the robots 3. As long as the current position of the article O is calculated in the cell controlling device 18, even when one of the robots 3 is temporarily turned off due to maintenance, etc., the task can be continued by using other robots 3.

Figure 6:
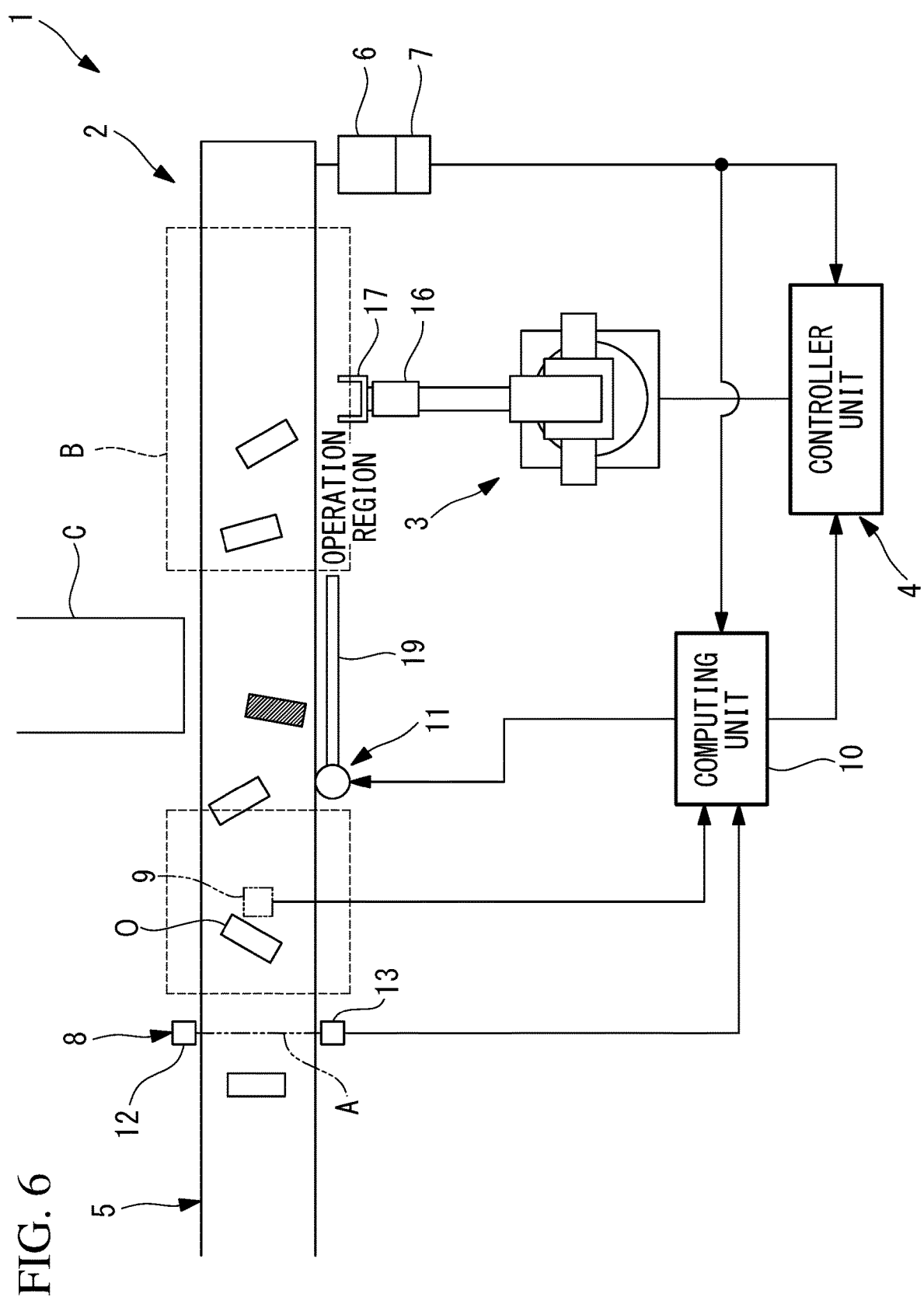
FIG. 6 is an enlarged view of a third modification of the robot system illustrated in FIG. 1.
Figure 7:
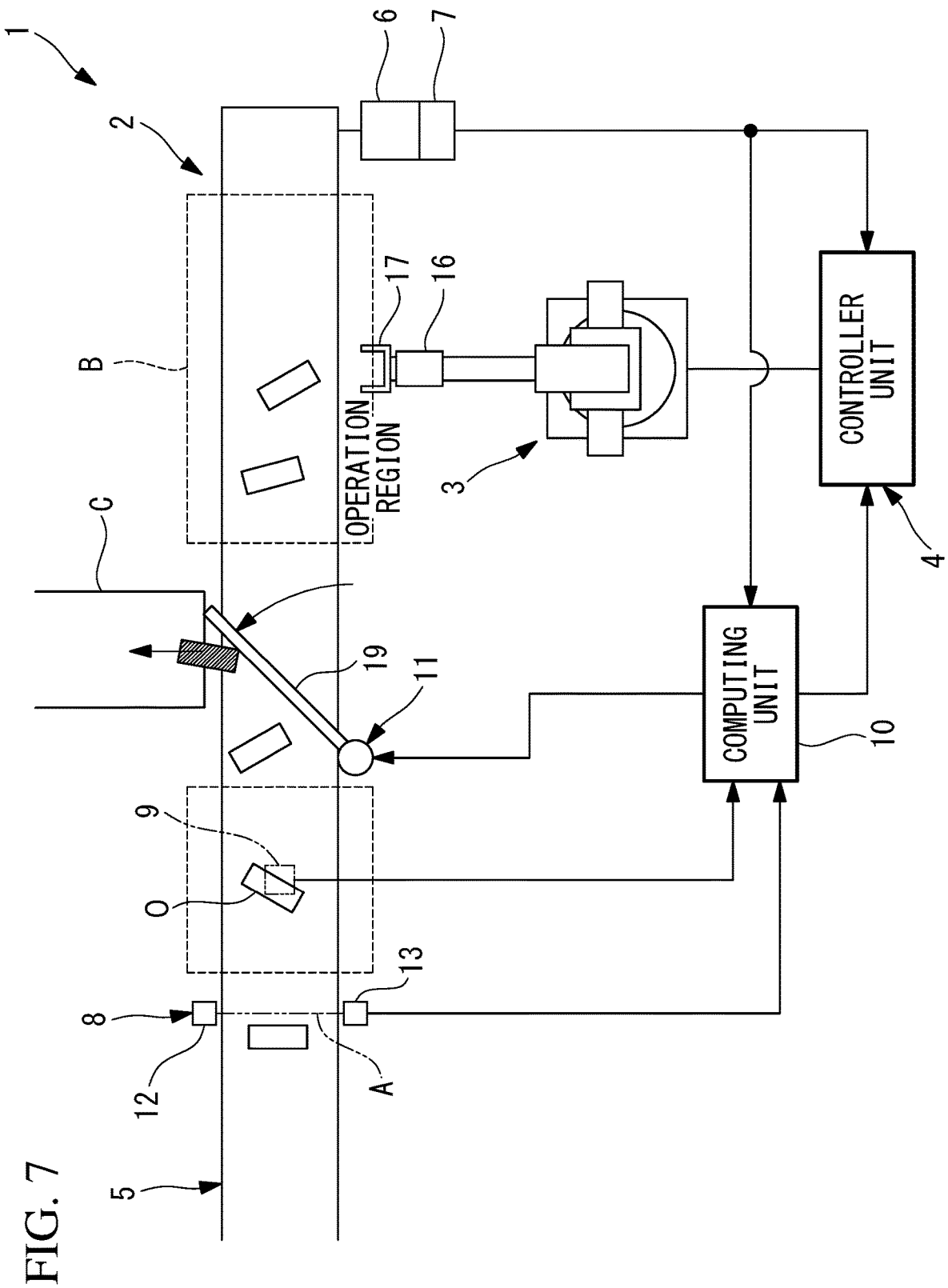
FIG. 7 is a diagram that illustrates the task performed with a removal unit of the robot system illustrated in FIG. 6.

A structure that pushes out the article O by moving a bar-shaped removal piece 14 in the width direction of the conveyor 5 is described as an example of the removal unit 11. Alternatively, as illustrated in FIGS. 6 and 7, a structure equipped with a pushing piece 19 that pivots on the vertical axis above the conveyor 5 may be employed so that the article O is pushed out by the pushing piece 19 in the width direction of the conveyor 5 due to the kinetic energy of the conveyor 5 as the pushing piece 19 is caused to project obliquely with respect to the transfer direction into the space above the conveyor 5. Alternatively, the removal unit 11 may employ any other desired structure.

An aspect of the present invention is directed to an article transfer system including a transfer device that transfers an article in one direction; a travel distance detecting unit that sequentially detects a distance the article transferred by the transfer device has traveled; an article sensing unit that senses passage of the article transferred by the transfer device; an image capturing unit that photographs the article, the image capturing unit being disposed downstream of the article sensing unit in a transfer direction of the transfer device; a position-and-orientation detecting unit that processes an image captured with the image capturing unit to extract the article and detect a position and an orientation of the article; and a removal unit that removes the article, which has been sensed with the article sensing unit but not extracted by the process performed in the position-and-orientation detecting unit, from the transfer device, the removal unit being disposed downstream of the image capturing unit.

According to this aspect, when the article is transferred by the transfer device, the article sensing unit senses the passage of the article, and then the article is photographed with an image capturing unit to capture an image. The captured image is processed in the position-and-orientation detecting unit so as to extract the article and detect the position and orientation of the extracted article.

Meanwhile, the travel distance of the article is sequentially detected with the travel distance detecting unit. Thus, it is not necessary to sequentially photograph the transfer device with the image capturing unit and sequentially process images in the position-and-orientation detecting unit. That is, the position and orientation of the article can be detected by capturing an image with the image capturing unit only when it is determined that the article, after having been sensed with the article sensing unit, has entered the field of view of the image capturing unit on the basis of the distance the sensed article has travelled sequentially detected with the travel distance detecting unit. Thus, the process can be simplified.

In this case, for some reason such as ambient light, etc., the article sensed with the article sensing unit cannot always be extracted from the image captured with the image capturing unit. In such a case, the removal unit is operated on the basis of sensing of the article in the article sensing unit and the article travel distance detected in the travel distance detecting unit, and the unextracted article is removed from the transfer device. As a result, the article, position and orientation of which are undetected due to extraction failure in the position-and-orientation detecting unit although the article exists on the transfer device, can be prevented from interfering the task performed on other articles.

In the aspect described above, the transfer device may be a conveyor that transfers the article mounted thereon, and the article sensing unit may have an optical axis extending in a width direction above the conveyor with a gap between the conveyor and the optical axis, and may sense the article crossing the optical axis.

With this structure, as an article mounted on the conveyor is transferred in one direction by the operation of the conveyor and passes through the position where the optical axis of the article sensing unit is present, the article blocks the light at that moment. Thus, the position of the article in the transfer direction can be accurately sensed. Moreover, when the article passes through the optical axis position, light is no longer blocked by the article and detection of light is resumed. Thus, it can be accurately sensed that the article has passed the optical axis position that moment.

In the aspect described above, the image capturing unit may photograph the article, which is being transferred by the transfer device, from above the transfer device.

With this structure, the position-and-orientation detecting unit can easily detect, on the basis of the captured image, the position of the article in the horizontal direction and the rotation angle of the article about the vertical axis.

In the aspect described above, the removal unit may push the article in a width direction of the transfer device to remove the article from the transfer device.

With this structure, the article can be unfailingly removed from the transfer device by using the removal unit irrespective of the position of the article in the width direction of the transfer device. In other words, the current position of the article in the transfer direction can be accurately identified by the article sensing unit and the travel distance detecting unit. Thus, even when the position and orientation are not extracted in the position-and-orientation detecting unit, the article can be unfailingly removed from the transfer device.

Another aspect of the present invention is directed to a robot system including the article transfer system according to any one of the systems described above; a robot that performs a task on the article, which is being transferred by the transfer device, in an operation region disposed downstream of the removal unit of the article transfer system; and a controller unit that controls the robot, in which the controller unit commands the robot to track the article on the basis of a travel distance of the article detected with the travel distance detecting unit and a position and an orientation of the article detected with the position-and-orientation detecting unit.

According to this aspect, the article, position and orientation of which are undetected due to extraction failure in the position-and-orientation detecting unit although the article exists on the transfer device, is removed from the transfer device by the removal unit upstream of the robot operation region. Thus, interference with the robot handling other articles can be more assuredly prevented.

The present invention offers the advantageous effect that even when an article is present at a position where the camera has failed to detect the article, operation can be performed without interference with other articles.

REFERENCE SIGNS LIST

1 robot system
2 article transfer system
3 robot
4 controller unit
5 conveyor (transfer device)
7 encoder (travel distance detecting unit)
8 sensor (article sensing unit)
9 camera (image capturing unit)
10 computing unit (position-and-orientation detecting unit)
11 removal unit
A optical axis
B operation region
O article

The invention claimed is:

1. An article transfer system, comprising:
   a transfer device that transfers an article in one direction;
   a travel distance detecting unit that sequentially detects a distance the article transferred by the transfer device has traveled;
   an article sensing unit that senses passage of the article transferred by the transfer device;
   an image capturing unit that photographs the article, the image capturing unit being disposed downstream of the article sensing unit in a transfer direction of the transfer device;
   a position-and-orientation detecting unit that processes an image captured with the image capturing unit to extract the article and detect a position and an orientation of the article; and
   a removal unit that removes the article, which has been sensed with the article sensing unit but not extracted by the process performed in the position-and-orientation detecting unit, from the transfer device, the removal unit being disposed downstream of the image capturing unit.

2. The article transfer system according to claim 1, wherein:
   the transfer device is a conveyor that transfers the article mounted thereon, and
   the article sensing unit has an optical axis extending in a width direction above the conveyor with a gap between the conveyor and the optical axis, and senses the article crossing the optical axis.

3. The article transfer system according to claim 1, wherein the image capturing unit photographs the article, which is being transferred by the transfer device, from above the transfer device.

4. The article transfer system according to claim 1, wherein the removal unit pushes the article in a width direction of the transfer device to remove the article from the transfer device.

5. A robot system comprising:
   the article transfer system according to claim 1;
   a robot that performs a task on the article, which is being transferred by the transfer device, in an operation region disposed downstream of the removal unit of the article transfer system; and
   a controller unit that controls the robot,
   wherein the controller unit commands the robot to track the article on a basis of a travel distance of the article detected with the travel distance detecting unit and a position and an orientation of the article detected with the position-and-orientation detecting unit.

* * * * *